Figure 1:
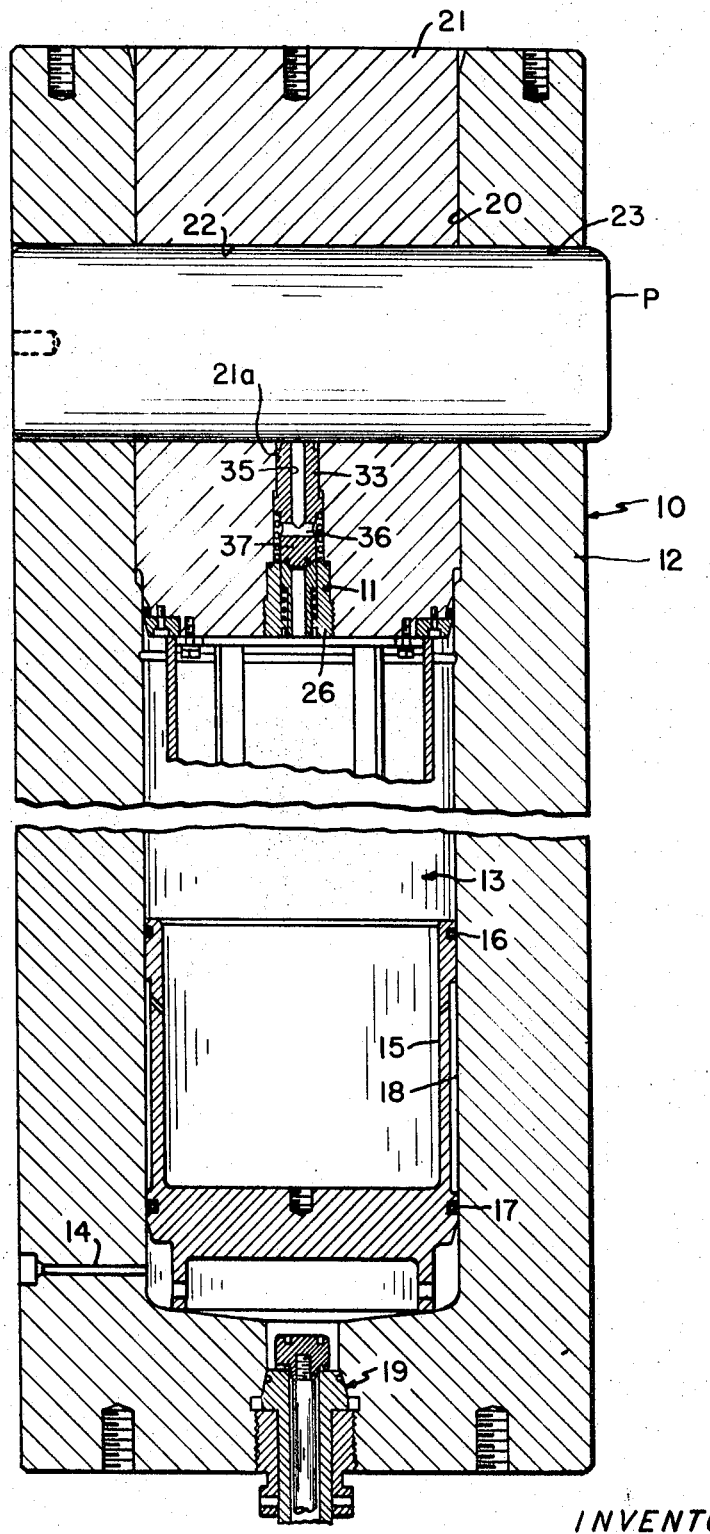

United States Patent

[11] 3,578,201

[72] Inventor Charles W. Smith, Jr.
Erie, Pa.
[21] Appl. No. 862,262
[22] Filed Sept. 30, 1969
[45] Patented May 11, 1971
[73] Assignee Autoclave Engineers, Inc.
Erie, Pa.

[54] VENT VALVE ASSEMBLY
7 Claims, 2 Drawing Figs.
[52] U.S. Cl........................................... 220/44,
137/540, 137/469, 137/43, 220/55.3
[51] Int. Cl........................................... B65d 51/16
[50] Field of Search............................ 220/44,
55.3; 137/469, 43, 540

[56] References Cited
UNITED STATES PATENTS
2,710,627  6/1955  Wagner et al............... 220/44X
2,712,829  7/1955  Whitaker..................... 137/469
2,738,796  3/1956  Chadwick.................... 220/44X Primary Examiner—George T. Hall
Attorney—Webb, Burden, Robinson & Webb ABSTRACT: A vent and drain valve useful for venting a pressure chamber and draining displaced fluid from within the chamber, as in an isostatic press, including a housing supporting independently biased, vertically slideably upper and lower plungers having cooperating working faces. The valve, which is positioned in a base in the cover for the chamber, provides an opening through the cover to permit flow of fluid upwardly through the valve from within the chamber. As pressure is increased in the chamber, the lower plunger is moved upwardly to cause the plunger faces to seal against one another to prevent leakage through the valve.

Patented May 11, 1971

3,578,201

2 Sheets-Sheet 1

INVENTOR.
Charles W. Smith, Jr.

BY Webb Burden Robinson & Webb

HIS ATTORNEYS

INVENTOR.
Charles W. Smith, Jr.

VENT VALVE ASSEMBLY

This invention relates to a valve assembly and particularly to a combination vent and drain valve useful in connection with an isostatic press.

In such a press, the vessel body must be full of fluid at all times due to the location of a fluid reservoir surrounding the top portion of the vessel. When the cover is lowered into position, some of this fluid must be forced out of the vessel by displacement. In the absence of a valve assembly, the fluid would have to be forced from the vessel through a very small annulus between the body and the cover, requiring a high downward force on the cover.

My valve provides an opening through the cover which permits the escape of fluid from the vessel as the cover is placed into position. Once in position, a lock pin is inserted above my vent and drain valve forcing a first or upper vent plunger of the valve downwardly against a second or lower plunger to effect an initial seal to close the vessel. As pressure is increased in the vessel, the lower plunger of my valve is forced upwardly against the first vent plunger to maintain a seal at all times during the pressurization cycle of the vessel. Among the advantages of my valve is that it provides a positive seal against pressure leakage from within the vessel; functions as a safety device, preventing release of the pressure closure lock pin without release of pressure from within the vessel; prevents pressurization of the vessel unless the lock pin is properly engaged; and is useful for extremely high pressures. The device is easily operated and has application anywhere conventional valves are used.

Figure 2:
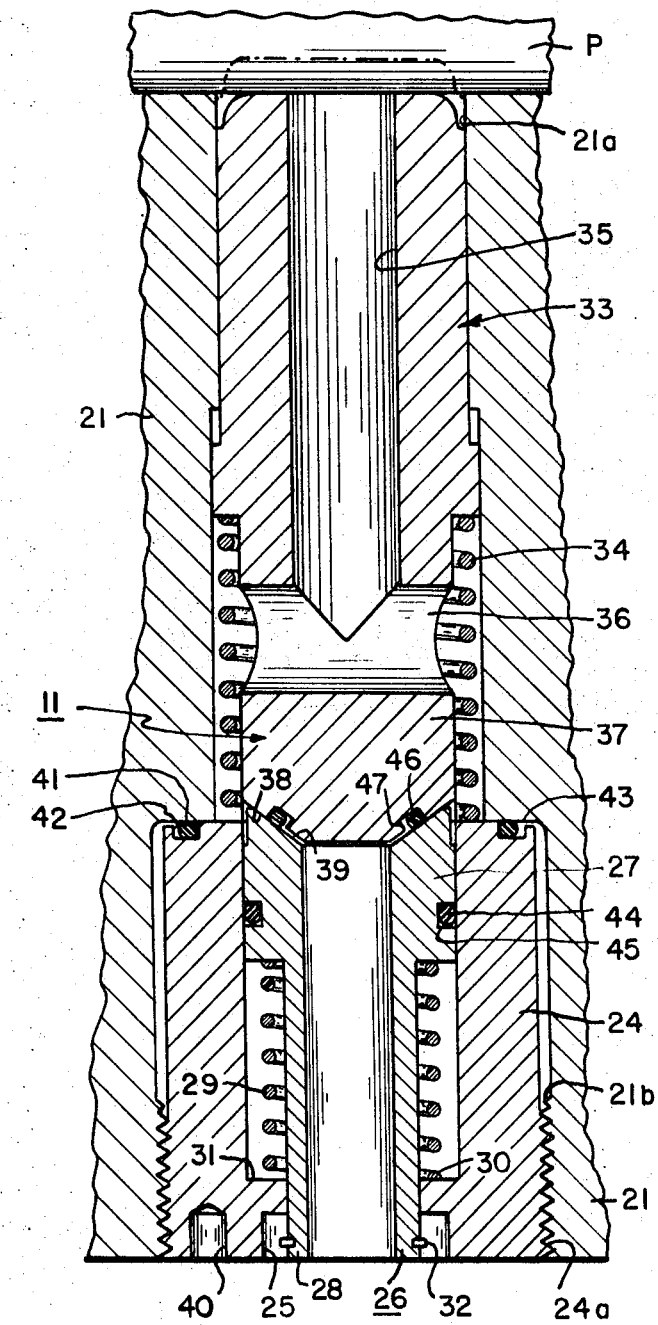

A more complete understanding of my invention will be obtained from a reading of the present specification and the accompanying drawings in which:

FIG. 1 is a partial cross-sectional schematic view of an isostatic press in operating position showing the location of my novel vent and drain valve; and FIG. 2 is a sectional view of my vent and drain valve, the dashed lines showing the maximum open position of the valve.

Isostatic pressing is used for the production of many types of ceramic and powdered metal shapes. Examples of such items are bearings, turbine buckets or blades, crucibles, missile nose cones, etc.; some materials now being isostatically pressed, for example, are aluminum, beryllium, ceramics, iron molybdenum, stainless steel, titanium, tungsten, and uranium carbides.

As isostatic system comprises essentially a pressure chamber or vessel, a pump and connecting plumbing. A deformable container, such as a bag, may be used to hold the material being compacted. Either liquid or gas may be used as the pressurizing fluid or medium. The material may be cold pressed, warm pressed, or hot-gas bonded.

An isostatic press is capable of applying pressure of 60,000 p.s.i. or greater. Isostatic pressing offers many advantages over mechanical or hydraulic pressing, the most important of which is that high and uniform density in the shape being worked is obtained through three dimensional pressure application. The isostatic process enables larger and more complex shapes to be produced than formerly could be made by mechanical or hydraulic pressing, greater ratios of length to diameter are possible, and the process is equally useful for the pressing of high strength, high temperature metals such as tungsten, tantalum and molybdenum, as well as such nonmetallics as powdered oxides, carbides and cermets.

In FIG. 1, I have shown, in schematic, an isostatic press 10 incorporating my novel vent and drain valve 11. The press is shown in operating position and comprises a body 12, the central portion of which is hollow and forms a vessel or pressure chamber 13. A connection 14 for introducing pressure into the chamber extends through the wall of the body 12. In the illustrated embodiment of the press, piston 15 is slideably mounted within the chamber above this connection. O-rings 16 and 17, disposed about the piston, seal the space between the piston and chamber wall 18 against the escape of pressure from below the piston. The piston thus effectively isolates the fluid in the chamber from the pressurizing fluid. Valve assembly 19 extends through the bottom of the body to communicate with the bottom of the chamber. Once pressurized, pressure may be relieved from within the chamber below the piston by the action of valve assembly 19.

In another embodiment of the press, not show, the piston and O-rings are eliminated and the fluid introduced through the connection 14 acts directly as the pressurizing fluid. Pressure may also be relieved from such a press with my novel vent valve assembly.

At the top of the body 12 and above the chamber is a bore 20. A cover 21, having a diameter slightly less than the diameter of the bore 20 above the piston, closes this opening. A transverse hole 22 extends across the cover. When the cover 21 is placed into the bore 20 to seal the chamber 13, the opening 22 is aligned with opposed transverse openings 23 in the wall of the body.

My new vent and drain valve 11 is located in a bore 21a in the center of the cover. As shown in FIG. 2, the valve 11 comprises a housing 24, which is secured by engagement of threads 24a with threads 21b in the lower end of the bore. A cavity 25 at the end of bore 21a communicates at its lower end with the pressure chamber 13. A lower plunger 26, including a head 27 and a depending stem 28 is slideably mounted in cavity 25 on a compression spring 29. An end of the spring 30 rests on an annular shoulder 31 above the bottom of the cavity; the other end of the spring abuts the back face of the plunger head 27 to normally bias the plunger upwardly. The plunger stem 28, which fits closely within the annular shoulder 31, includes a snap ring 32 which acts as a stop to limit travel of the plunger 26.

A vent member 33 is moveably mounted in the upper end of bore 21a, and is axially aligned with the housing 24. A compression spring 34 which surrounds member 33 normally biases it upwardly. One end of the spring abuts the end of housing 24; the other abuts a shoulder along the wall of the vent member 33. An axial passageway 35 extends through the member 33 from its upper end and communicates with a transverse passageway 36 through the member above the upper plunger. The lower end of the vent member 33 includes a plunger head 37 having a face 38 which conforms to a face 39 of the lower plunger.

When the vent and drain valve are used in a pin closure type isostatic press and the cover is in position but not locked, the end of the vent member 33 extends slightly into the transverse opening for a pin. To lock this type press to begin the pressure cycle, a threadless closure lock pin P is forced through the aligned transverse openings in the body and in the cover member. When using my vent valve assembly, securing of the pin will result in the vent member being detented against compression springs 29, 34.

To reduce the amount of fluid required through pumping and thereby the time to pressurize, it is desirable to have the fluid reservoir of an isostatic press above the pressure chamber. When the reservoir is above the pressure chamber, however, to force a cover into the opening in the press body, it is necessary to displace the fluid in the reservoir; thus, to close the cover in position so that the pressure cycle can begin takes a great deal of force. My novel vent and drain valve permits fluid to be bled through the vent and drain valve from within the pressure chamber through the valve and out through the cover. This will be explained in respect to FIG. 2. Once the cover is securely locked into position by the closure lock pin, the chamber can be pressurized.

Referring particularly to FIG. 2 in which I have shown a cross-sectional view of my vent and drain valve, the valve comprises a housing member 24 which is secured into the bottom of the cover 21. Hole 40 is one of two holes for inserting a tool, such as a spanner wrench, for tightening housing 24 into cover 21. An O-ring 41 is disposed in a groove 42 cut around the end of the valve housing 24 and is held in the groove by a shoulder 43 formed in the cover. An O-ring 44 is also provided in a groove 45 surrounding the lower plunger head 27. The O-ring prevents leakage between the wall of the housing and the head of the plunger which slides therein. The head, and specifically the face of the upper plunger, is configured to complement the face of the lower plunger. In a preferred embodiment, the two faces are sealed against leakage by an O-ring 46 which rides in a groove 47 cut in the face of one of the plungers, as shown in face 38 of the upper plunger. As pressure is increased in the closed vessel below, the faces are pressed together. Leakage between the faces is prevented by the O-ring seal. Thus, FIG. 2 clearly shows a fluid passageway through the valve comprising an axial opening and a transverse opening through the vent member, an annular passageway between the vent member and the cover body past spring 34, between the faces of the upper plunger and the lower plunger and the bore through the lower plunger to the pressure chamber. This passageway provides the means for exhausting displaced fluid when closing the cover of the vessel for pressurizing. By causing the vent member to detent by inserting the threadless closure lock pin, the upper plunger face is pressed against the lower plunger face to provide a pressure seal.

The preferred configuration and sealing arrangement of the plunger heads of my vent and drain valve are based on the physical unsupported area principle. I provide a contact pressure between tapered faces of the plungers which is always greater than the chamber pressure. This prevents the O-ring 46 in sealing position between the plunger faces from extruding and breaking the seal.

The head 37 of the upper plunger is configured in the shape of a truncated cone while the complementary head 27 of the lower plunger is in the form of an inverted truncated cone. When the two are forced together against the sealing O-ring 46 provided between the plunger faces, a positive seal is made by my vent and drain valve. As the pressure is increased in the chamber, the lower plunger is forced upwardly against the upper plunger maintaining a seal at all times during the pressurization cycle of the vessel.

The present invention simplifies lowering, engaging, and closing an isostatic press for pressure cycling. Its use permits fluid to be exhausted from the chamber during the cover lowering and pressurizing process, as well as preventing pressure buildup if the press is not properly and securely closed.

I claim:

1. A vent and drain valve assembly for controlled venting of a fluid under pressure through a bore in which the assembly is positioned comprising:
   A. a valve housing secured in an end of the bore and having a central opening;
   B. a first plunger moveable within the opening and having an axial passageway;
   C. a vent member moveable in the other end of the bore and having
      1. an end forming a second plunger for cooperating with the first plunger to prevent fluid passage through the bore;
      2. the second plunger being of smaller cross section than the bore to provide a clearance therebetween, defining an annular passageway around the plunger;
      3. an axial opening extending from an end of the bore;
      4. a transverse opening connecting the axial opening and the annular passageway;
   D. first resilient means surrounding and urging said first plunger in the direction of the second plunger;
   E. second resilient means surrounding the vent member and urging the second plunger in the direction away from the first plunger whereby the valve is normally open to permit fluid to flow through the valve; and
   F. means for detenting the vent member to force the second plunger against the second resilient means into sealing engagement with the first plunger, whereby fluid flow through the valve is prevented.

2. A valve assembly as set forth in claim 1 in which the resilient means are coiled springs.

3. A valve assembly as set forth in claim 1 in which at least one of the plungers carries an O-ring which is adapted to engage the other plunger upon contacting engagement of the plungers.

4. A valve assembly as set forth in claim 1 in which an O-ring is disposed around the first plunger and in the housing opening to prevent leakage of fluid therebetween.

5. In apparatus having a body forming a pressure chamber adapted to be closed by a cover, the improvement in a valve for venting said chamber through the cover, in which the valve is positioned in a bore in the cover and communicates with the chamber and with atmosphere, comprising:
   A. a valve housing secured in an end of the bore and having a central opening;
   B. a first plunger moveable within the opening and having an axial passageway;
   C. a vent member moveable in the other end of the bore and having
      1. an end forming a second plunger for cooperating with the first plunger to prevent passage of fluid through the bore;
      2. the second plunger being of smaller cross section than the bore to provide a clearance therebetween defining an annular passageway;
      3. an axial opening extending from the end of the bore;
      4. a transverse opening therethrough connecting the axial opening to the annular passageway;
   D. first resilient means surrounding and urging said first plunger in the direction of the second plunger;
   E. second resilient means surrounding the vent member and urging the second plunger in the direction away from the first plunger whereby the valve is normally open to permit fluid to flow through the valve; and
   F. means for detenting the vent member to force the second plunger against the second resilient means into sealing engagement with the first plunger, whereby fluid flow through the valve is prevented.

6. In apparatus as set forth in claim 5 and including a pair of transversely aligned holes through the body and cover, a closure pin extending through the holes to secure the cover to the body, the closure pin being adapted to contact and detent the vent member.

7. In a pressure valve positioned in a bore, wherein fluid flows under pressure into an end of the valve, passes through the valve and exits through the opposite end of the valve, the improvement comprising:
   A. a pair of axially moveable opposed plungers mounted in opposite ends of the valve;
   B. each plunger including an axial passageway and having a head portion;
   C. each passageway being normally in communication with a part of the bore between the plungers;
   D. the head portion of one of the plungers being frustoconical and extending in the direction of the other plunger;
   E. the head portion of the other plunger being of complementary configuration to said one plunger to tightly engage said plunger head portion; and
   F. a groove surrounding the head portion of the first plunger and adapted to receive an O-ring whereby when the plungers engage one another under forces from opposite ends of the bore, the plunger heads are pressed against an O-ring disposed in the groove to seal the bore against fluid flow therethrough.